(12) United States Patent
Bleizeffer et al.

(10) Patent No.: US 6,195,653 B1
(45) Date of Patent: Feb. 27, 2001

(54) SYSTEM AND METHOD FOR SELECTIVELY PREPARING CUSTOMIZED REPORTS OF QUERY EXPLAIN DATA

(75) Inventors: Terry Michael Bleizeffer, Durham, NC (US); Tanya Couch, San Jose, CA (US); Catherine Elizabeth Wuebker Drummond, Morgan Hill, CA (US); Virginia Walbridge Hughes, Jr., Hollister, CA (US); Theresa Hsing Lai, Saratoga, CA (US); Joseph Davis Lea, III, Chapel Hill, NC (US); David Harold Oberstadt, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,595

(22) Filed: Jan. 13, 2000

Related U.S. Application Data

(63) Continuation-in-part of application No. 08/949,636, filed on Oct. 14, 1997.

(51) Int. Cl.[7] ................................................... G06F 17/30
(52) U.S. Cl. ................................. 707/2; 707/4; 707/104; 707/526
(58) Field of Search ............................... 707/2, 104, 102, 707/4, 526

(56) References Cited

U.S. PATENT DOCUMENTS

| | | | |
|---|---|---|---|
| 5,311,438 | 5/1994 | Sellers et al. | 364/468 |
| 5,548,758 | * 8/1996 | Pirahesh et al. | 707/2 |
| 5,768,578 | * 6/1998 | Kirk et al. | 707/100 |
| 5,778,354 | * 7/1998 | Leslie et al. | 707/2 |
| 5,781,735 | 7/1998 | Southard | 395/200.54 |
| 5,787,416 | 7/1998 | Tabb et al. | 707/2 |
| 5,852,819 | 12/1998 | Beller | 707/1 |

OTHER PUBLICATIONS

Sartori et al., Partial Indexing for Nonuniform Data Distributions in Relational DBMS's IEEE electronic library online, pp. 420–429, Jun. 1994.*

* cited by examiner

*Primary Examiner*—John Breene
*Assistant Examiner*—Greta Robinson
(74) *Attorney, Agent, or Firm*—Madson & Metcalf

(57) ABSTRACT

A method for selectively preparing customized reports of query explain data comprises selectively retrieving from the database subsets of the query explain data for the at least one query statement; formatting the subsets for display to a user; displaying within a report customization window one or more controls for selectively designating subsets of the query explain data for the at least one query statement to be included in the report; and in response to selection of the one or more controls, generating a report that includes the designated subsets of the query explain data for the at least one query statement.

57 Claims, 10 Drawing Sheets

```
SELECT T1.NAME, T1.DEPT
   FROM T1, T2, T3
      WHERE T1.SALARY = T2.SALARY
      AND T2.DEPT = T3.DEPT
      AND T1.SALARY =
         (SELECT INCOME FROM T4
          WHERE LOCATION = STL)
```

RDBMS
54

74

| QUERYNO | 214 | 214 | 214 | 214 | |
|---|---|---|---|---|---|
| QBLOCKNO | 1 | 1 | 1 | 2 | etc. |
| APPLNAME | PLAN1 | PLAN1 | PLAN1 | PLAN1 | |
| PROGNAME | DNSEMPL1 | DNSEMPL1 | DNSEMPL1 | DNSEMPL1 | |
| PLANNO | 1 | 2 | 3 | 1 | |
| METHOD | 0 | 1 | 1 | 1 | |
| TNAME | T1 | T2 | T3 | T4 | |
| TABNO | 1 | 2 | 3 | 1 | |
| ACCESSTYPE | I | I | I | R | |
| MATCHCOLS | 1 | 1 | 1 | 1 | |
| ACCESSNAME | IDX1 | IDX2 | IDX3 | IDX4 | |
| INDEXONLY | N | Y | Y | N | |
| SORTN_UNIQ | N | N | N | N | |
| SORTN_JOIN | N | N | N | N | |
| SORTN_ORDERBY | N | N | N | N | |
| SORTN_GROUPBY | N | N | N | N | |
| SORTC_UNIQ | N | N | N | N | |
| SORTC_JOIN | N | N | N | N | |
| SORTC_ORDERBY | N | N | N | N | |
| SORTC_GROUPBY | N | N | N | N | |
| PREFETCH | L | | | | |
| MIXOPSEQ | 0 | 0 | 0 | 0 | |
| etc. | | | | | |

SYSTEM AND METHOD FOR SELECTIVELY PREPARING CUSTOMIZED REPORTS OF QUERY EXPLAIN DATA

RELATED APPLICATIONS

This application is a continuation-in-part of U.S. patent application Ser. No. 08/949,636, filed Oct. 14, 1997, for "Interpreting Data Using a Graphical User Interface," which is incorporated herein by reference.

BACKGROUND OF THE INVENTION

1. Identification of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. The Field of the Invention

The present invention relates generally to computer-implemented database systems. More specifically, the present invention relates to selectively preparing a customized report of query explain data for one or more query statements.

3. The Relevant Technology

Databases are computerized information storage and retrieval systems. A Relational Database Management System (RDBMS) is a database system which uses relational techniques for storing and retrieving data. Relational databases are organized into tables consisting of rows (tuples) and columns of data. A database typically includes many tables, and each table includes multiple rows and columns. The tables are conventionally stored in direct access storage devices (DASD), such as magnetic or optical disk drives, for semi-permanent storage.

Generally, users communicate with an RDBMS using a Structured Query Language (SQL) interface. The SQL interface allows users to create, manipulate, and query a database by formulating relational operations on the tables, either interactively, in batch files, or embedded in host languages such as C and COBOL. SQL has evolved into a standard language for RDBMS software and has been adopted as such by both the American National Standards Institute (ANSI) and the International Standards Organization (ISO).

The SQL standard provides that each RDBMS should respond to a particular query in the same way, regardless of the underlying database. However, the method that the RDBMS actually uses to find the requested information in the database is left to the RDBMS. Typically, there is more than one method that can be used by the RDBMS to access the requested data. The RDBMS, therefore, attempts to select the method that minimizes the computer time and resources (i.e. cost) for executing the query.

The RDBMS determines how to execute the SQL statements. The set of steps created by the RDBMS for executing the SQL statements is commonly referred to as the "access path." In other words, the access path is a sequence of operations used by the RDBMS to obtain the data requested by the SQL query. Depending on the access path, an SQL statement might search an entire table space, or, alternatively, it might use an index. The access path is the key to determining how well an SQL statement performs. The description of the access path is stored in a plan table, which typically stores the access path data for a plurality of SQL statements.

In addition to determining the access path, some databases estimate the cost for executing each SQL statement. The estimated costs are typically stored in a statement table (as in the case of DB2® for OS/390®) or a similar table within the database. Like the plan table, the statement table stores the estimated statement costs for a plurality of SQL statements.

Databases also typically include statistics for such database objects as table spaces, indexes, tables, and columns. For example, in the case of a table, the statistical data may include the number of pages that contain rows of the table, the number of rows and columns in the table, as well as various other statistical data. The statistics are typically derived from the RDBMS "catalog," which is an object that describes the entire database.

The above-described access path data, statement cost data, and object statistics data (referred to collectively as "query explain data") assist the user in analyzing and improving the performance of SQL statements. For example, a query with a higher-than-average statement cost might alert the user to inefficiencies in the access path. By viewing the access path data, the user can selectively make changes to the query and/or the database, such as by adding an index in order to avoid a table space scan. The object statistics data similarly assists the user by describing the structure and organization of the database.

Unfortunately, an analysis of SQL query performance is currently too time-consuming and complex for the average user. In conventional systems, the user must manually locate the relevant query explain data in a plurality of tables, i.e. the plan table, the statement table, and the catalog, which can be a tedious and time-consuming task.

Moreover, each of the tables typically stores information corresponding to many different statements and objects. Consequently, the tables are often very large, making it difficult to locate the desired data. Likewise, the tables are often cryptic and hard to understand, even for database experts. For example, the plan table typically includes sixty or more columns and hundreds or thousands of rows. The access path data is stored in a tabular format which, although easily understood by the RDBMS, is often too complicated to be effectively analyzed.

Accordingly, what is needed is a system, method, and article of manufacture in which a user can selectively prepare a report including the access path data, statement cost data, and object statistics data for one or more query statements. What is also needed is a system, method, and article of manufacture in which a user can choose among a plurality of query statements to include in the report. What is also needed is system, method, and article of manufacture in which the user can selectively include details of access path steps and database objects relevant to the selected query statements. What is also needed is a system, method, and, article of manufacture for combining the selected query explain data into a single report that is readily understandable to a user.

SUMMARY OF THE INVENTION

The present invention solves the foregoing problems by providing a system, method, and article of manufacture for selectively preparing customized reports of query explain data for one or more query statements.

In one aspect of the invention, an apparatus for selectively preparing customized reports of query explain data includes a processor for executing instructions and a memory device having thereon modules of operational data and executable code for execution by the processor. In one embodiment, the modules include a plurality of report generation modules configured to selectively retrieve from the database subsets of the query explain data for the at least one query statement and to format the subsets for display to a user; a customization module configured to provide a report customization window on a display device; a controls module configured to provide within the report customization window one or more controls for selectively designating subsets of the query explain data for the at least one query statement to be included in the report; and a controls link module operably linking the one or more controls with the plurality of report generation modules such that the report generation modules are selectively invokable by the one or more controls to include in the report the designated subsets of the query explain data for the at least one query statement.

In another aspect of the invention, a method for selectively preparing customized reports of query explain data comprises selectively retrieving from the database subsets of the query explain data for the at least one query statement; formatting the subsets for display to a user; displaying within a report customization window one or more controls for selectively designating subsets of the query explain data for the at least one query statement to be included in the report; and in response to selection of the one or more controls, generating a report that includes the designated subsets of the query explain data for the at least one query statement.

In yet another aspect of the invention, an article of manufacture comprises a program storage medium readable by a processor and embodying one or more instructions executable by the processor to perform the above-described method for selectively preparing customized reports of query explain data for at least one query statement to be executed by a database.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 is an illustration of a query statement and a portion of a plan table according to one embodiment of the invention;

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 10, is not intended to limit the scope of the invention, as claimed, but is merely representative of presently preferred embodiments of the invention.

FIGS. 1 through 3, 6 and 10 are schematic block diagrams and flow chart diagrams which illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable data, or merely an "executable," is intended to include any type of computer instructions and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
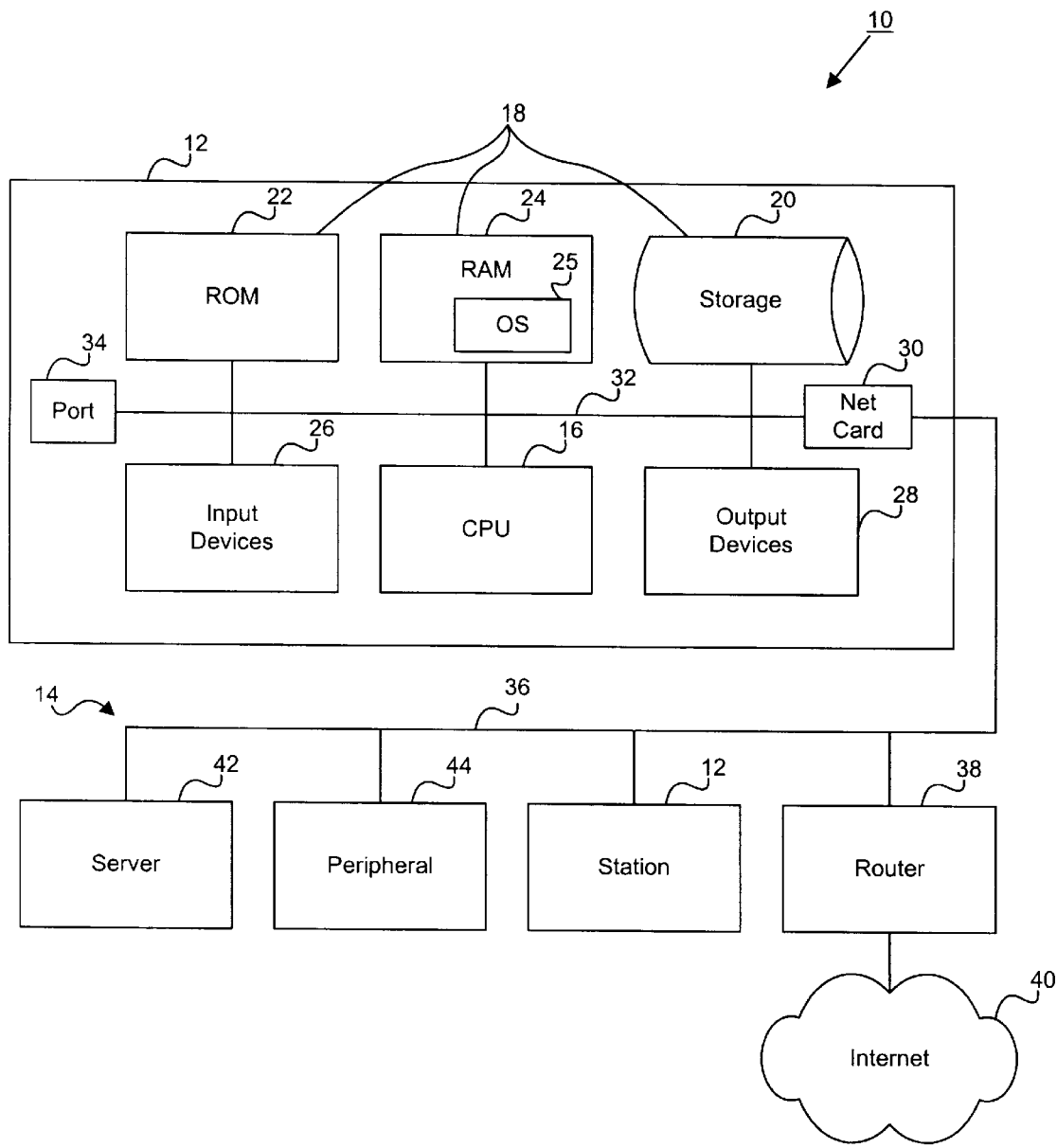
FIG. 1 is a schematic block diagram of a computer system suitable for implementing one embodiment of the invention.

FIG. 1 is a schematic block diagram which illustrates a computer system 10 in which executable and operational data, operating in accordance with the present invention, may be hosted on one or more computer stations 12 in a network 14. The network 14 may comprise a wide area network (WAN) or local area network (LAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD-ROM drive, a read-only memory (ROM) 22, and a random access volatile memory (RAM) 24. Preferably, the computer station 12 operates under the control of an operating system (OS) 25, such as MVS®, OS/390®, AIX®, OS/2®, WINDOWS NT®, WINDOWS®, UNIX®, and the like.

The computer station 12 or system 10 in general may also include one or more input devices 26, such as a mouse or keyboard, for receiving inputs from a user or from another device. Similarly, one or more output devices 28, such as a monitor or printer, may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28, the network card 30, and one or more additional ports 34. The system bus 32 and a network backbone 36 may be regarded as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an intranet, or as in the manner depicted, a system of interconnected networks such as the Internet 40. The individual stations 12 communicate with each other over the backbone 36 and/or over the Internet 40 with varying degrees and types of communication capabilities and logic capability. The individual stations 12 may include a mainframe computer on which the modules of the present invention may be hosted.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
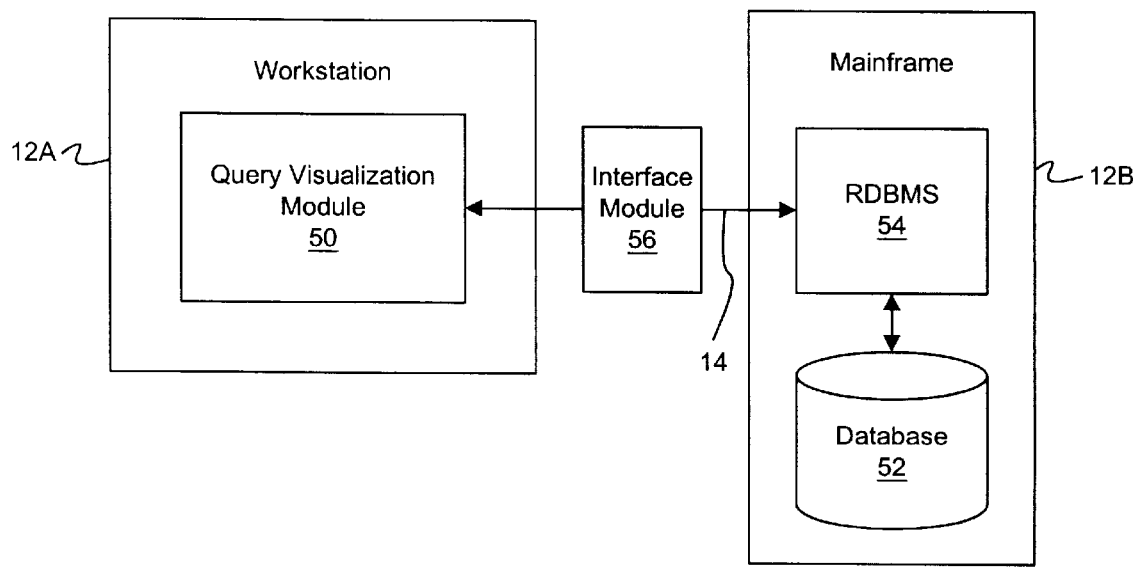
FIG. 2 is a schematic block diagram of a system for selectively preparing customized reports of query explain data according to one embodiment of the invention.

Referring now to FIG. 2, a schematic block diagram of one embodiment of the invention includes first and second stations 12A, 12B. The first station 12A is preferably a workstation-class computer, such as a PC™ workstation, available from IBM Corporation. The second station 12B is preferably an IBM mainframe computer operating under MVS® or OS/390®. In one embodiment, the stations 12A, 12B are coupled via a network 14 using a distributed remote data architecture (DRDA). Those skilled in the art, however, will recognize that the invention could be implemented using a variety of computing platforms and network architectures.

In one embodiment, the first station 12A includes a query visualization module 50, which is a tool that assists a user in visualizing query explain data for one or more query statements to be executed by a database 52. The second station 12B preferably stores the database 52, as well as an RDBMS 54 for managing the database 52, such as DB2® for OS/390®, available from IBM. As used herein, the term "database" may generically refer to a combination of the RDBMS 54 and the database 52. In one embodiment, the query visualization module 50 and the RDBMS 54 are linked via an interface module 56, such as DB2 Connect®, also available from IBM.

Figure 3:
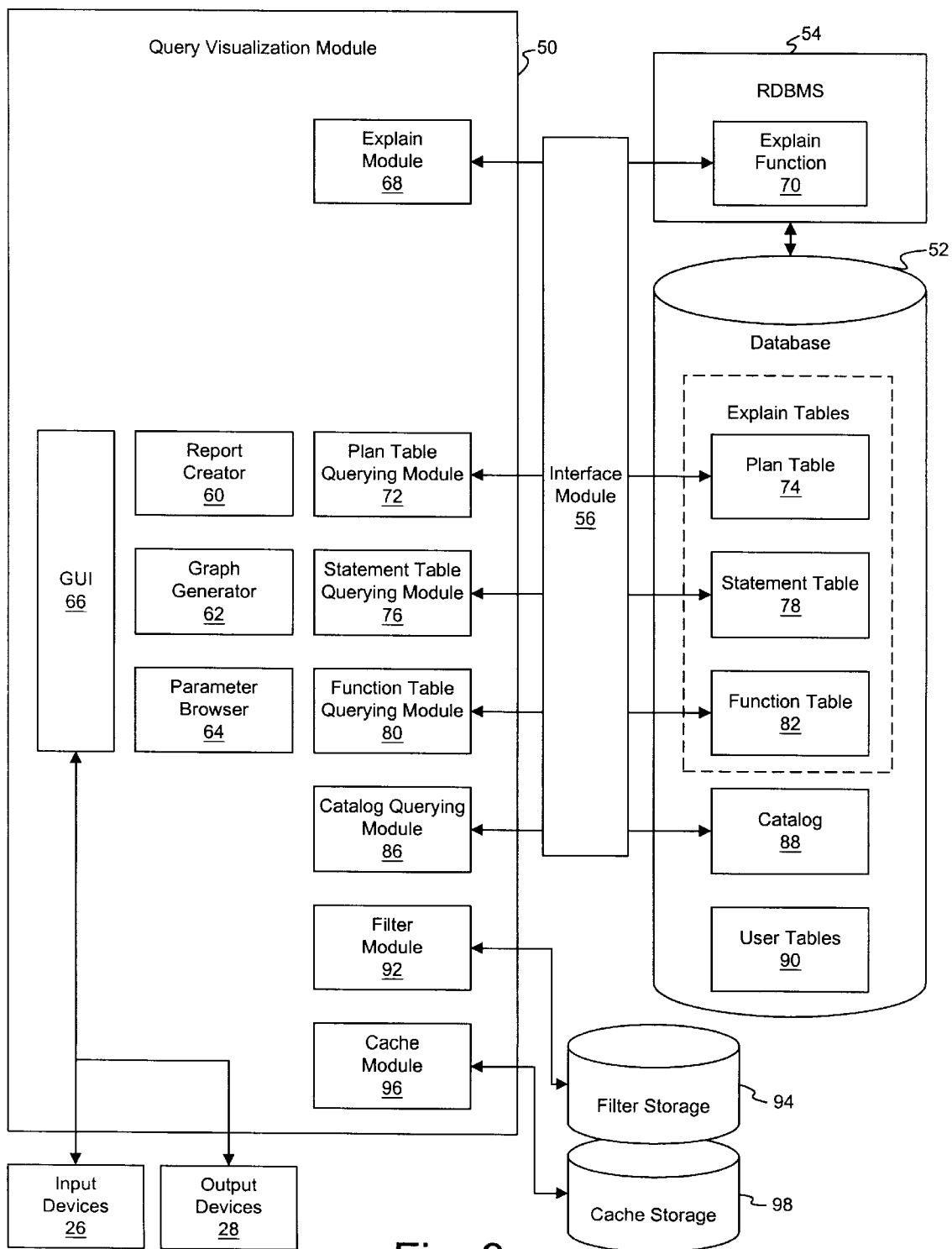
FIG. 3 is a schematic block diagram of a query visualization module according to one embodiment of the invention.

Referring now to FIG. 3, the query visualization module 50 preferably includes a plurality of modules containing executable and operational data suitable for operation within the memory devices 18 of FIG. 1. Of course, the memory devices 18 in which the modules of the present invention are located may also be distributed across both local and remote computer stations 12. Likewise, two or more illustrated modules may be integrated into a single module without departing from the scope of the invention.

The principal components of the query visualization module 50 include a report creator 60, a graph generator 62, and a parameter browser 64. The above-described modules help the user to better understand the query explain data, the subsystem parameters, and the like, in a variety of ways. For example, as described in greater detail below, the report creator 60 selectively prepares a report of the access path data, statement cost data, and object statistics data in an easily understood, text-based format. The user selects one or more query statements, as well as subsets of the query explain data for the selected query statements to include in the report. The report provides the user with the requested query explain data in a centralized and readily understood format, allowing the user to efficiently analyze and improve SQL query performance.

A second principal component of the query visualization module 50 is the graph generator 62, which prepares a graphical representation of the access path of a query statement. The graph generator is more fully described in co-pending application Ser. No. 08/949,636, filed Oct. 14, 1997, for "Interpreting Data Using a Graphical User Interface," and is incorporated herein by reference. FIG. 4 illustrates an exemplary SQL query statement, processed by the RDBMS 54 to generate access path data, and stored within a plan table 74 according to one embodiment of the present invention.

Figure 5:
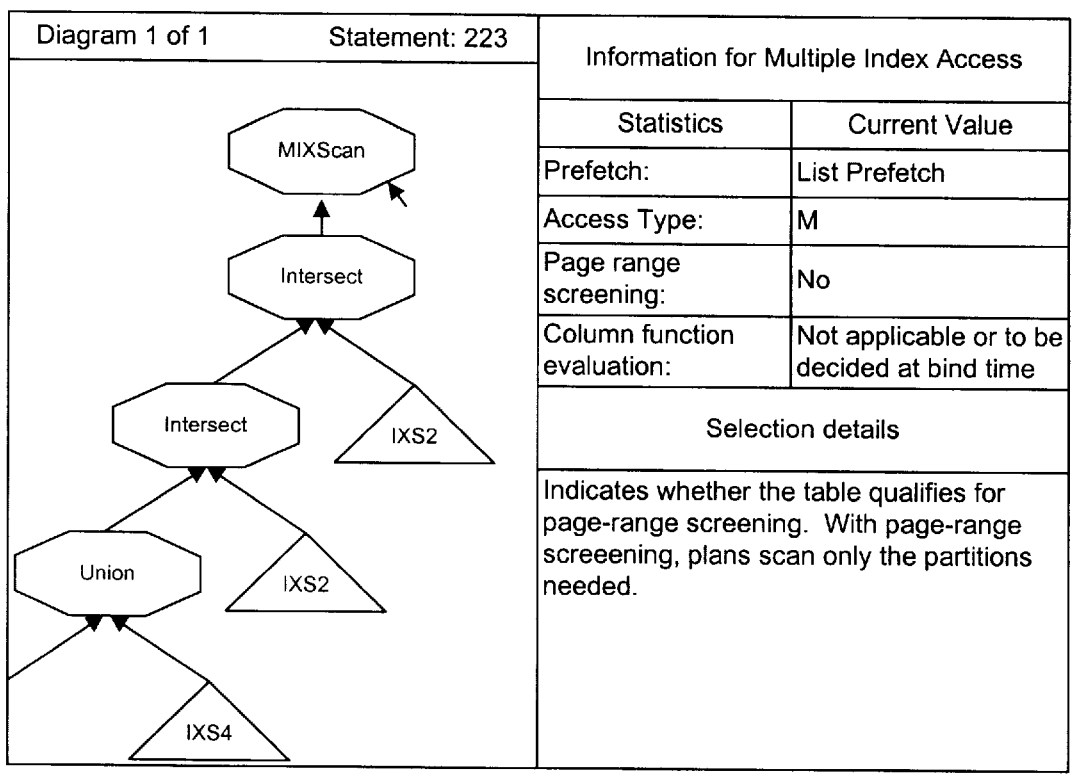
FIG. 5 is an illustration of a graphical representation of an access path according to one embodiment of the invention.

As shown in FIG. 5, the graph generator 62 in one embodiment uses the plan table 74 to generate a graphical representation of the access path. Access path steps of an SQL statement are graphically represented as nodes within a tree-like structure. Tables, indexes, and operations are graphically represented with unique symbols that indicate the item being represented. For example, rectangles represent tables, triangles represent indexes, and octagons represent operations such as table space scans, index scans, joins, etc. The graphical representation shows the relationship between the database objects and the operations. When the user selects a node of the graphical representation, detailed information related to the selected node is displayed on the right side of the display.

Referring again to FIG. 3, a third principal component of the query visualization module 50 is the parameter browser 64. Preferably, the parameter browser 64 allows a user to selectively view the subsystem parameters, for example, DSNZPARM and DSNHDECP values, used by a subsystem, as well as the install panel names and fields. Access to subsystem parameters is useful in analyzing the performance of query statements. Like the graph generator 62, the parameter browser 64 is more fully described in co-pending application Ser. No. 08/949,636, filed Oct. 14, 1997, for "Interpreting Data Using a Graphical User Interface."

The report creator 60, graph generator 62, and parameter browser 64 are each preferably coupled to a graphical user interface (GUI) module 66. Preferably, the GUI module 66 is operably coupled to the input and output devices 26, 28 to allow the user to interact with the report creator 60, graph generator 62, and parameter browser 64.

The query visualization module 50 in the depicted embodiment also includes an explain module 68, which invokes a corresponding explain function 70 in the RDBMS 54. When invoked, the explain function 70 causes the RDBMS 54 to generate function data, access path data, and statement cost data (referred to herein as "explain data") for a specified query statement.

Explainable query statements include SELECT (except for SELECT INTO) and INSERT statements, and the searched form of UPDATE and DELETE statements. The explain module 68 is used to invoke an explain function 70 within the RDBMS 54 to immediately generate explain data for a specific SQL statement. This feature is useful for interactively testing specified SQL statements. Alternatively, the RDBMS 54 generates the explain data at bind time in the context of an application or package upon encountering an EXPLAIN(YES) option of the BIND command.

In one embodiment, the query visualization module 50 includes a plurality of querying modules for querying various tables in the database 52. For example, a plan table querying module 72 queries a plan table 74 to obtain access path data. Likewise, a statement table querying module 76 queries a statement table 78 to obtain statement cost data. A function table querying module 80 queries a function table 82 to obtain data concerning user-defined functions. The plan table 74, the statement table 78, and the function table 82 are collectively referred to herein as "explain tables." Finally, a catalog querying module 86 queries the RDBMS catalog 88 to obtain object statistics for one or more database objects contained within in a plurality of user tables 90.

Although the querying function is implemented herein by four separate modules, those skilled in the art will recognize that the described functionality could be implemented by fewer modules. Additionally, in one embodiment, the above-described modules use the interface module 56 when communicating with the RDBMS 54 and database 52.

Preferably, the query visualization module 50 also includes a filter module 92. In one embodiment, the filter module 92 allows a user to filter a list of explainable query statements according to various user-selected criteria, including statement costs, references to particular database objects, and the inclusion of particular steps in the access paths of the statements. Moreover, in one embodiment, the user may assign a name to a set of filter criteria and save the named set in a filter storage 94. This allows the user to easily retrieve a specified set of filter criteria such that only the explainable query statements satisfying the criteria are listed. In one embodiment, the filter module 92 also allows a user to filter the explain tables directly according to user-defined filters.

The query visualization module 50 also preferably includes a cache module 96, which caches portions of the above-described tables in a cache storage 98. For example, when the plan table querying module 72 retrieves access path data from the plan table 74, the access path data is preferably stored, and future accesses to the same data will be retrieved from the cache storage 98. Various methods may be employed for managing data in the cache storage 98, such as automatically deleting a percentage of the cached data when the amount of the data exceeds a pre-defined threshold.

Figure 6:
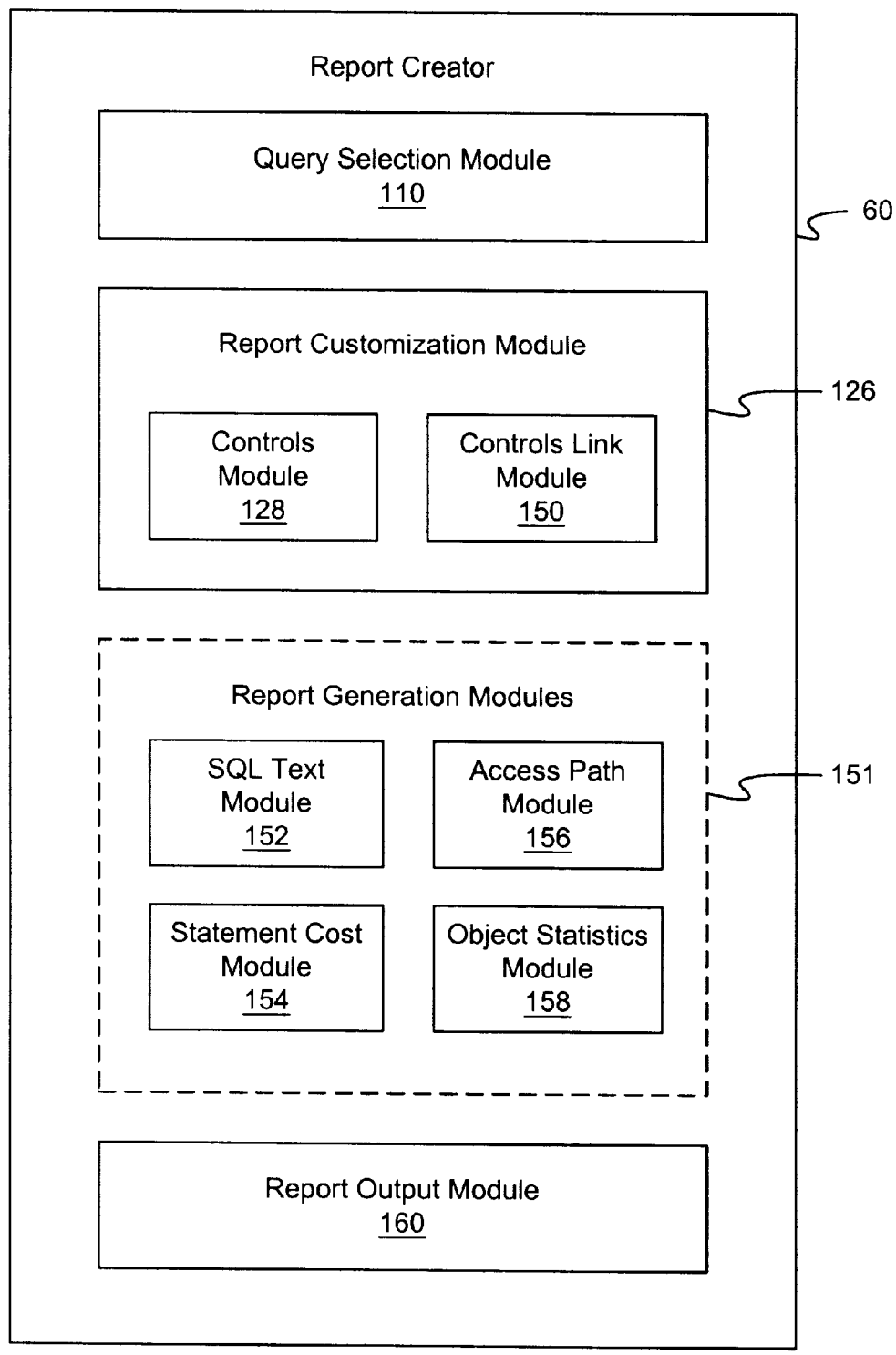
FIG. 6 is a schematic block diagram of a report creator according to one embodiment of the invention.

Referring now to FIG. 6, the report creator 60 preferably includes a plurality of modules containing executable and operational data suitable for operation within the memory devices 18 of FIG. 1. Preferably, the modules operate within the workstation 12A. However, in alternative embodiments, the memory devices 18 in which the modules are located may be distributed across both local and remote computer stations 12. Likewise, two or more illustrated modules may be integrated into a single module without departing from the scope of the invention.

In one embodiment, the report creator 60 includes a query selection module 110 that receives a user selection of one or more explainable query statements. As noted above, the query selection module 110 may interact with the filter module 92 to list only the statements satisfying a set of user-specified criteria.

Figure 7:
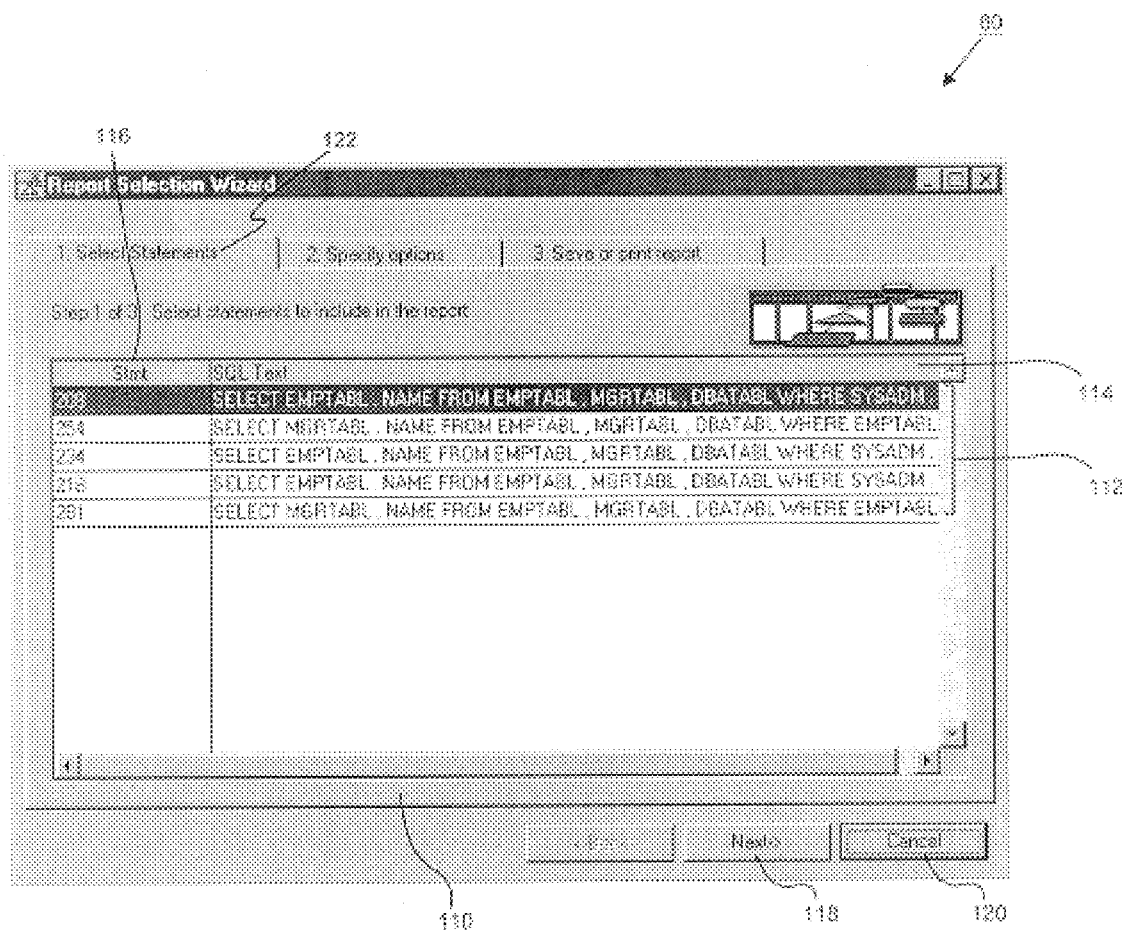
FIG. 7 is an illustration of an interactive display provided by a query selection module according to one embodiment of the invention.

FIG. 7 is an illustration of an interactive display generated by the query selection module 110 in one embodiment of the invention. In the depicted embodiment, the query selection module 110 displays for a user a plurality of selectable query statements 112. Preferably, each selectable query statement 112 includes an SQL text field 114 showing at least a portion of the SQL text of the query statement for identification purposes. In one embodiment, the selectable query statement 112 may also include a statement ID field 116 for storing a statement number or other unique identifier assigned by the RDBMS 54. Using conventional keyboard or mouse commands, the user may select or more of the selectable query statements 112, such as by clicking, dragging, or the like.

As illustrated in FIG. 7, the query selection module 110 is preferably implemented in the context of a wizard, i.e. a utility within an application program that leads a user through a series of steps to accomplish a particular task. Wizards typically include interactive displays consisting of several tabbed pages, each of which includes selections to be made by the user during each step. The user can proceed to a next step by clicking on a tab corresponding to a subsequent step or by means of a "next" button 118. The report creation process may be canceled by clicking on a "cancel" button 120. In one embodiment, the query selection module 110 corresponds to a "select statements" tab 122 in the report creator 60 wizard. Those skilled in the art, however, will recognize that a variety of user interfaces could be used without departing from the scope of the invention.

Referring back to FIG. 6, the report creator 60 also includes, in the depicted embodiment, a report customization module 126. The purpose of the customization module 126 is to allow a user to designate various subsets of the query explain data to include in the report for each selected query statement. For example, in some cases, the user may wish to see only the statement cost data in order to determine how well the selected query statements will perform. Thus, there is no need to provide comprehensive access path descriptions and object statistics data. Indeed, providing too much data is one of the deficiencies of prior systems. By contrast, the report customization module 126 allows the user to create customized reports including only those subsets of the query explain data that the user believes are relevant to the task of analyzing and improving SQL performance.

Figure 8:
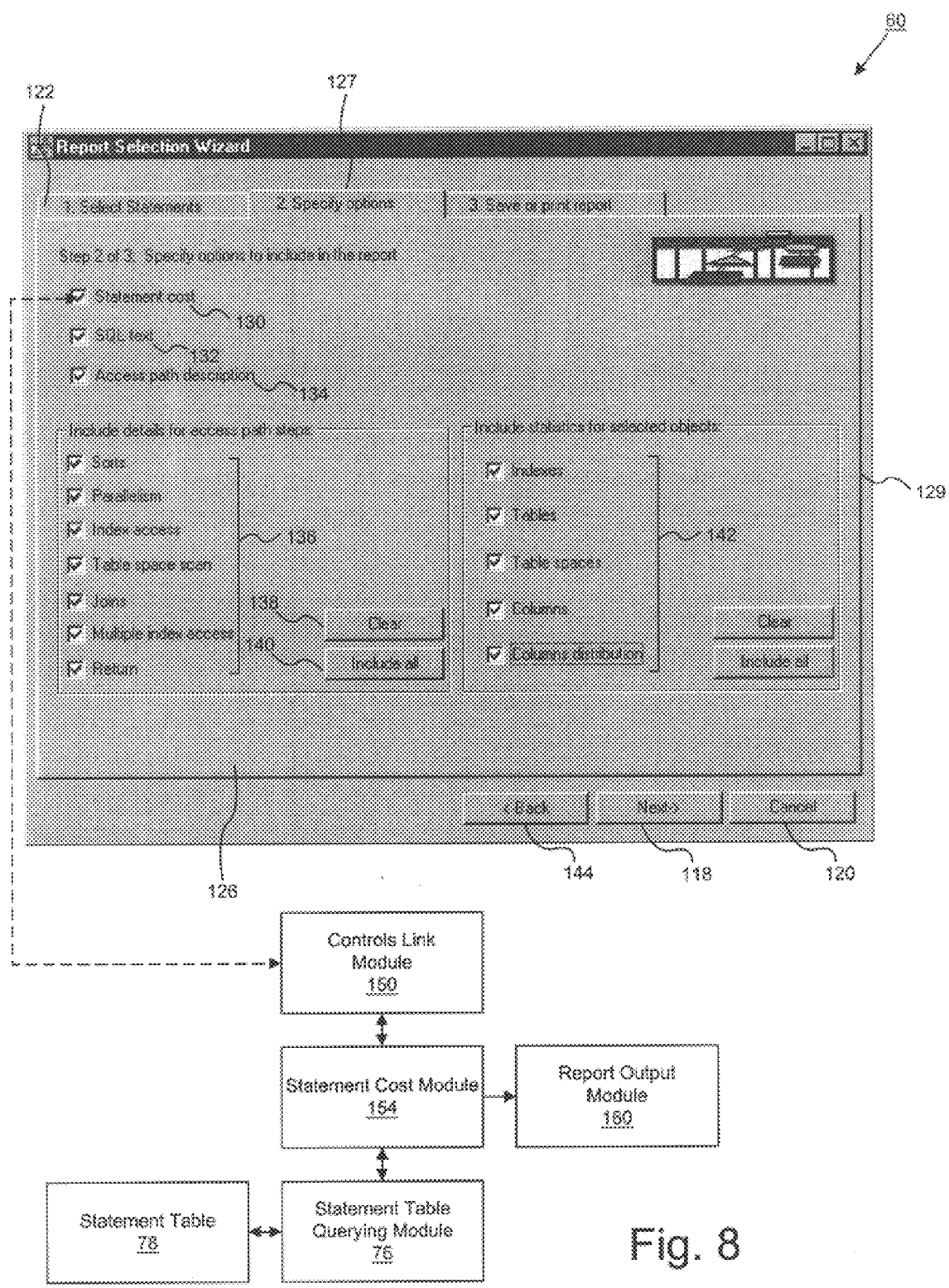
FIG. 8 is an illustration of an interactive display provided by a report customization module according to one embodiment of the invention.

In one embodiment, the report customization module 126 also includes a controls module 128. Preferably, the controls module 128 generates a plurality of selectable controls for designating the subsets of the query explain data to include in the report. In one embodiment, the report customization module 126 provides a customization window 129, as illustrated in FIG. 8, for displaying the selectable controls. Preferably, the controls may comprise check boxes. However, a variety of other selection mechanisms may be used, including as "radio" buttons, sliders, text fields, or the like. As in the case of the query selection module 110, the report customization module 126 is shown to correspond to a "specify options" tab 127 in the report creator 60 wizard.

In one embodiment, the controls module 128 of FIG. 6 includes a statement cost control 130, which allows a user to selectively include in the report the statement cost data for the selected query statements. Likewise, an SQL text control 132 is provided for designating the SQL text of the query statements to be included in the report. An access path description control 134 is also provided for including a description of the access path for each selected query statement in the report.

In one embodiment, a set 136 of controls is provided for including details of selected access path steps. For example, the control set 136 preferably includes individual controls corresponding to the following access path steps: sorts, parallelisms, index accesses, table space scan, joins, multiple index accesses, and returns. In one embodiment, a clear button 138 is provided for clearing all of the selections in the set 136, and an "include all" button 140 is provided for selecting all of the options in the set 136.

Similarly, in one embodiment, the controls module 128 provides a set 142 of controls for designating database objects for which statistics are to be provided in the report. For example, the control set 142 preferably includes individual controls corresponding to the following objects in the database: indexes, tables, table spaces, columns, and column distributions. In one embodiment, the report customization module 126 provides a "back" button 144 for returning control to the query selection module 110, allowing the user to make additional or different query statement selections.

Referring back to FIG. 6, the report creator 60 also preferably includes a controls link module 150, which links the selectable controls to a plurality of report generation modules 151, each of which are described more fully below. In one embodiment, the report generation modules 151 retrieve subsets of the query explain data from the various tables and format the subsets for display to a user. In the depicted embodiment, four report generation modules 151 are provided, including an SQL text module 152, a statement cost module 154, an access path module 156, and an object statistics module 158. By means of the controls link module 150, the report generation modules 151 are selectively invokable by the user to include the designated subsets in the report.

Preferably, invocation of the selected report generation modules 151 is delayed until the user completes the selection process, such as by clicking on the "next" button 118 or the like. However, in an alternative embodiment, the modules 151 are invoked as soon as the user selects the corresponding control, allowing the modules 151 to operate in the background while the user makes additional selections. Thus, when the selection process is complete, the requested data can be immediately made available to the user.

In one embodiment, the report generation modules 151 communicate with the previously-described querying modules to query the respective tables in the database. For example, the access path module 156 communicates with the plan table querying module 72 to query the plan table 74 to obtain the access path data. Likewise, the statement cost module 154 communicates with the statement table querying module 76 to query the statement table 78 to obtain the statement cost data. Finally, the object statistics module 158 communicates with the catalog querying module 86 to query the catalog 88 to obtain the object statistics data.

An example of the foregoing process is shown in FIG. 8, where the control link module 150 links the statement cost control 130 to the statement cost module 154. When a user activates the statement cost control 130, the statement cost module 154 communicates with the statement table querying module 76 to query the statement table 78 for the statement costs of each selected query statement. The statement cost module 154 then formats the statement cost information for display to a user and provides the formatted output to a report output module 160, as described more fully below. A similar schematic diagram could be drawn for each of the report generation modules.

The SQL text module 152 of FIG. 6 formats the text of the SQL query for display in the report to be generated. In one embodiment, as illustrated below, the SQL text is formatted such that SELECT, FROM, and WHERE statements are each displayed on a different line, and sub-queries and parameters are indented. This feature improves the readability of complex query statements.

In addition, the report output module 60 may include miscellaneous data in the report, such as the date and time of the report, the owner of the plan or package that includes the selected statements, the name of a plan or package, the bind time, etc. In one embodiment, this additional data is added whether or not the SQL text control 132 was selected. An example of a subset of the report generated by the SQL text module 152 is provided below:

---
IDENTIFICATION
Subsystem: DEMO
Report generation time: (08/11/1999 9:39:58 AM)
PLAN
Plan name: DEMOPLAN
Program name (DBRM): DEMODBRM
Plan owner: ADMF007
Last bind time: 1998-09-15-14.47.44.651874
SQL Text:
SELECT EMPTABL . NAME
FROM EMPTABL , MGRTABL , DBATABL
WHERE SYSADM . FN1
   ( EMPTABL . SALARY ) = SYSADM . FN1
   ( DBATABL . SALARY ) AND
   EMPTABL . DEPT = MGRTABL . DEPT
AND DBATABL . SALARY >=
   ( SELECT MAX
     ( SALARY )
   FROM MGRTABL
   WHERE DEPT = 'W38' AND SALARY > : H : H )

---

The statement cost module 154 obtains the statement cost data for the selected query statements and formats the data for inclusion in the report. This type of query explain data is useful for a number of reasons, such as detecting inefficiencies in the access path. The RDBMS 54 stores the statement cost data within the statement table 78 upon invocation of the explain function 70. Thus, in one embodiment, the statement cost module 154 uses the statement table querying module 76 to query the statement table 78 for the statement cost data.

In one embodiment, the statement cost for a query statement is displayed both in terms of cost in milliseconds and cost in service units. In one embodiment, the statement cost module 154 may include such additional information as the statement number, one or more cost categories, and a reason for the cost category. An example of a subset of the report generated by the statement cost module 154 is provided below:

---
STATEMENT INFORMATION
Statement number:   208
Statement Cost:
    Cost Category:         B
    Cost in milliseconds:  344489922
    Cost in service units: 106389665
    Reason:     HOST VARIABLES TABLE CARDINALITY UDF

---

The access path module 156 obtains the access path data for the selected query statements and formats the data for inclusion in the report. This type of query explain data is useful because it provides a detailed description of how the query statement will be executed by the database. Based on the access path data, the user may selectively change the query and/or the database to achieve improved SQL performance. The RDBMS 54 stores the access path data within the plan table 74 upon invocation of the explain function 70. Thus, in one embodiment, the access path module 156 uses the plan table querying module 72 to query the plan table 74 for the access path data.

In one embodiment, the access path module 156 communicates with the graph generator 62 to generate for the report a graphical representation of the access path, as illustrated in FIG. 5. The graph could be represented in the report as an in-line or linked graphical object, or by using a graphical character code set. Alternatively, the access path module 156 provides the access path description in a text-based format. An example of a subset of the report generated by the access path module 156 for the access path description is provided below:

---
ACCESS PATH DESCRIPTION

Select Statement
ADMF007.DBATABL (12)
| Table space scan (11)
ADMF007.EMPTABL (15)
| Table space scan (14)
Nested Loop Join (13)
| Sort (17)
ADMF007.MGRTABL (111)
| ADMF007.IDXD2 (110)
| Non-matching Index Scan (19)
| Sort (18)
Merge Scan Join (16)
Return (112)
Non-correlated subquery
ADMF007.MGRTABL (23)
| ADMF007.IDXD2 (22)
| Matching Index Scan (21)
Return (24)

---

As shown in FIG. 8, a user can selectively include details for specific access path steps using the control set 136. Thus, in one embodiment, the access path module 156 obtains the requested details from the plan table (using the plan table querying module 72) and formats the details in the report. An example of a subset of the report generated by the access path module 156 for the access path step details is provided below:

---
ACCESS PATH STEP INFORMATION
Table space scan   (11)
    Prefetch:                    Sequential
    Page range screening:        No
    Column function evaluation:
        Not applicable or to be decided at execution
Table space scan   (14)
    Prefetch:                    Sequential
    Page range screening:        No
    Column function evaluation:
        Not applicable or to be decided at execution
Nested Loop Join   (13)
    Join type:  Inner join
Sort   (17)
    Column function evaluation:
        Not applicable or to be decided at execution
    Reason for sort:
        The composite table is sorted to give the correct ordering for the join operation.
Non-matching Index Scan   (19)
    Matching index keys used:    0
    Index only access:           Yes
    Prefetch:                    Sequential
    Access type:                 I
    Page range screening:        No
    Column function evaluation:  Not applicable or to be decided at execution
Sort   (18)
    Column function evaluation:  Not applicable or to be decided at execution
    Reason for sort:             The new table is sorted to give the correct ordering for the join operation.
Merge Scan Join   (16)
    Join type:                   Inner join
    Number of columns joined:    1
Matching Index Scan   (21)
    Matching index keys used:    1
    Index only access:           Yes
    Prefetch:                    Sequential
    Access type:                 I
    Page range screening:        No
    Column function evaluation:  Column function evaluated when data is retrieved

---

The object statistics module 158 obtains the statistics for the one or more database objects specified in the control set 142 of FIG. 8. As noted above, this data is useful in analyzing SQL performance because it describes the structure and organization of the database objects. The object statistics are preferably stored in the RDBMS catalog 88 of FIG. 3. Thus, in one embodiment, the object statistics module 158 uses the catalog querying module 86 to obtain the statistics for the selected objects. An example of a subset of the report generated by the object statistics module 158 is provided below:

---
STATISTICS
Table Statistics:
    Table:   ADMF007.MGRTABL
    TYPE                         T
    CARDF                        10000 (default)
    EDPROC -continued

| | |
|---|---|
| NPAGES | 501 (default) |
| PCTPAGES | −1 |
| PCTROWCOMP | −1 |
| COLCOUNT | 3 |
| DBNAME | DBDATA1 |
| TSNAME | TSP1D1 |
| RECLENGTH | 26 |
| PARENTS | 0 |
| CHILDREN | 0 |
| STATSTIME | 0001-01-01-00.00.00.000000 |
| Index Statistics: | |
| Index:  ADMF007.IDXD2 | |
| CLUSTERED | N |
| CLUSTERING | N |
| CLUSTERRATIO | 0 |
| NLEAF | 33 (default) |
| NLEVELS | 2 (default) |
| FIRSTKEYCARDF | 25 (default) |
| FULLKEYCARDF | 25 (default) |
| CREATEDTS | 1998-05-06-11.49.36.355161 |
| UNIQUERULE | D |
| COLCOUNT | 2 |
| BPOOL | BP0 |
| STATSTIME | 0001-01-01-00.00.00.000000 |
| NAME | IDXD2 |
| CREATOR | ADMF007 |
| TBNAME | MGRTABL |
| TBCREATOR | ADMF007 |
| Table Space Statistics: | |
| Table Space:  TSP1D1 | |
| BPOOL | BP0 |
| PARTITIONS | 0 |
| LOCKRULE | A |
| PGSIZE | 4 |
| NTABLES | 5 |
| SEGSIZE | 0 |
| LOCKMAX | −1 |
| TYPE | |
| NACTIVE | 501 (default) |
| STATSTIME | 0001-01-01-00.00.00.000000 |
| Column Statistics: | |
| Table:  ADMF007.MGRTABL | |
| Column:  SALARY | |
| COLCARDF | 25 (default) |
| HIGH2KEY | 4040404040404040 |
| LOW2KEY | 4040404040404040 |
| COLNO | 3 |
| COLTYPE | INTEGER |
| LENGTH | 4 |
| NAME | SALARY |
| TBNAME | MGRTABL |
| TBCREATOR | ADMF007 |
| STATSTIME | 0001-01-01-00.00.00.000000 |
| NULLS | Y |
| Column Distribution Statistics: | |
| Table:  ADMF007.DBATABL | |
| Column:  DEPT | |
| COLVALUE | [0 212 246 246] |
| CARDF | −1.0 |
| COLGROUPCOLNO | |
| FREQUENCY | 2500 |
| NUMCOLUMNS | 1 |
| TYPE | F |
| STATSTIME | 1998-01-07-11.54.14.541525 |
| COLVALUE | [0 212 241 244] |
| CARDF | −1.0 |
| COLGROUPCOLNQ | |
| FREQUENCY | 2500 |
| NUMCOLUMNS | 1 |
| TYPE | F |
| STATSTIME | 1998-01-07-11.54.14.541525 |
| COLVALUE | [0 212 242 243] |
| CARDF | −1.0 |
| COLGROUPCOLNO | |
| FREQUENCY | 5000 |
| NUMCOLUMNS | 1 |
| TYPE | F |
| STATSTIME | 1998-01-07-11.54.14.541525 |

Referring again to FIG. 6, after the selected report generation modules have generated the formatted subsets of the report, the report output module 160 assembles the subsets into a single report for display to the user. Preferably, the subsets are arranged in the report in a pre-defined order. However, in an alternative embodiment, the user may specify the order in which the subsets are arranged.

Figure 9:
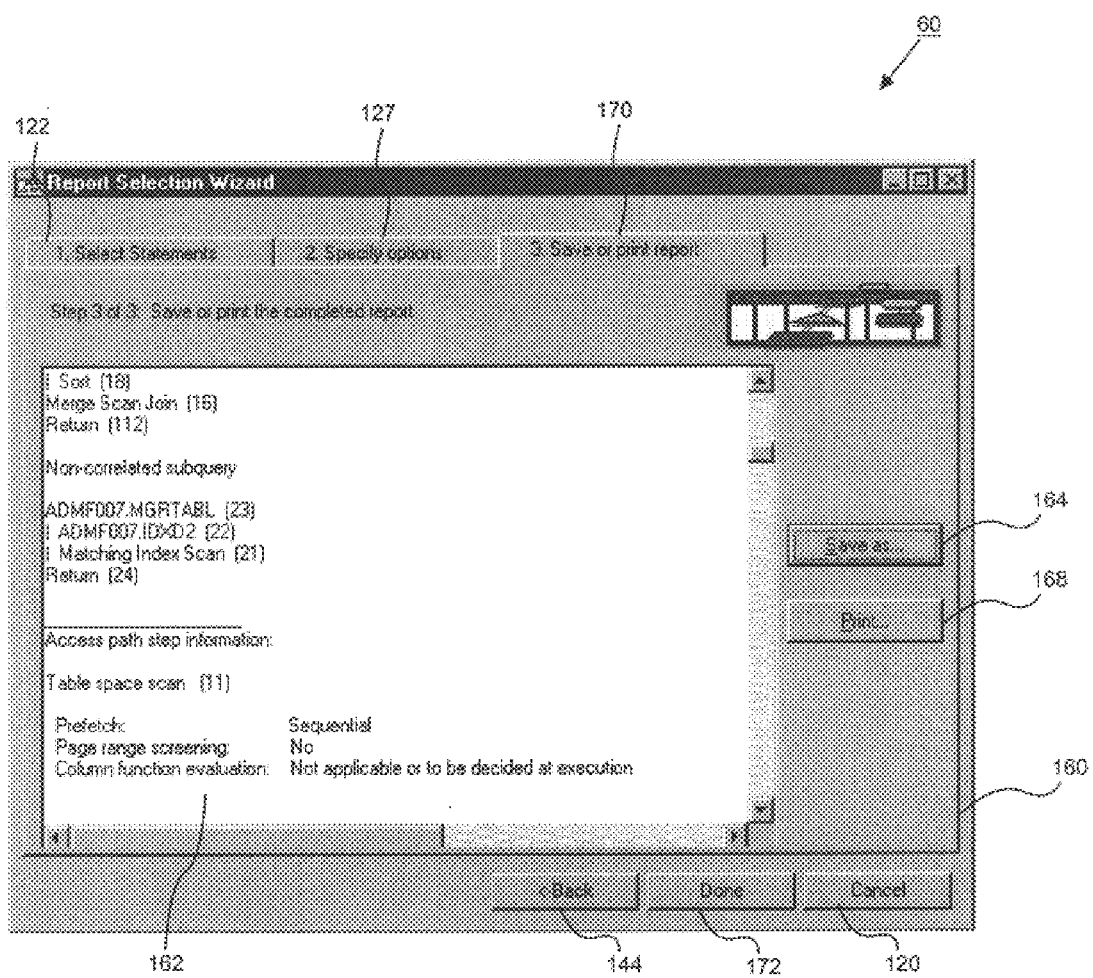
FIG. 9 is an illustration of an interactive display provided by a report output module according to one embodiment of the invention.

FIG. 9 is an illustration of an interactive display generated by the report output module 160 according to one embodiment of the present invention. Preferably, the report output module 160 creates a report display window 162 for displaying the report to the user. Preferably, the user may scroll through the text of the report using conventional mechanisms. In addition, the report output module 160 preferably provides a "save as" button 164. When activated, the "save as" button 164 opens a standard save dialog window (not shown), allowing the user to save the report as a standard text file. Similarly, the report output module 160 preferably provides a "print" button 168 which allows the user to send the report to a standard printer. The report output module 160 preferably corresponds to a "save or print report" tab 170 in the report creator 60 wizard. When the user has finished viewing, printing or saving the report, the user may exit the report creator 60 by clicking on a "done" button 172.

Figure 10:
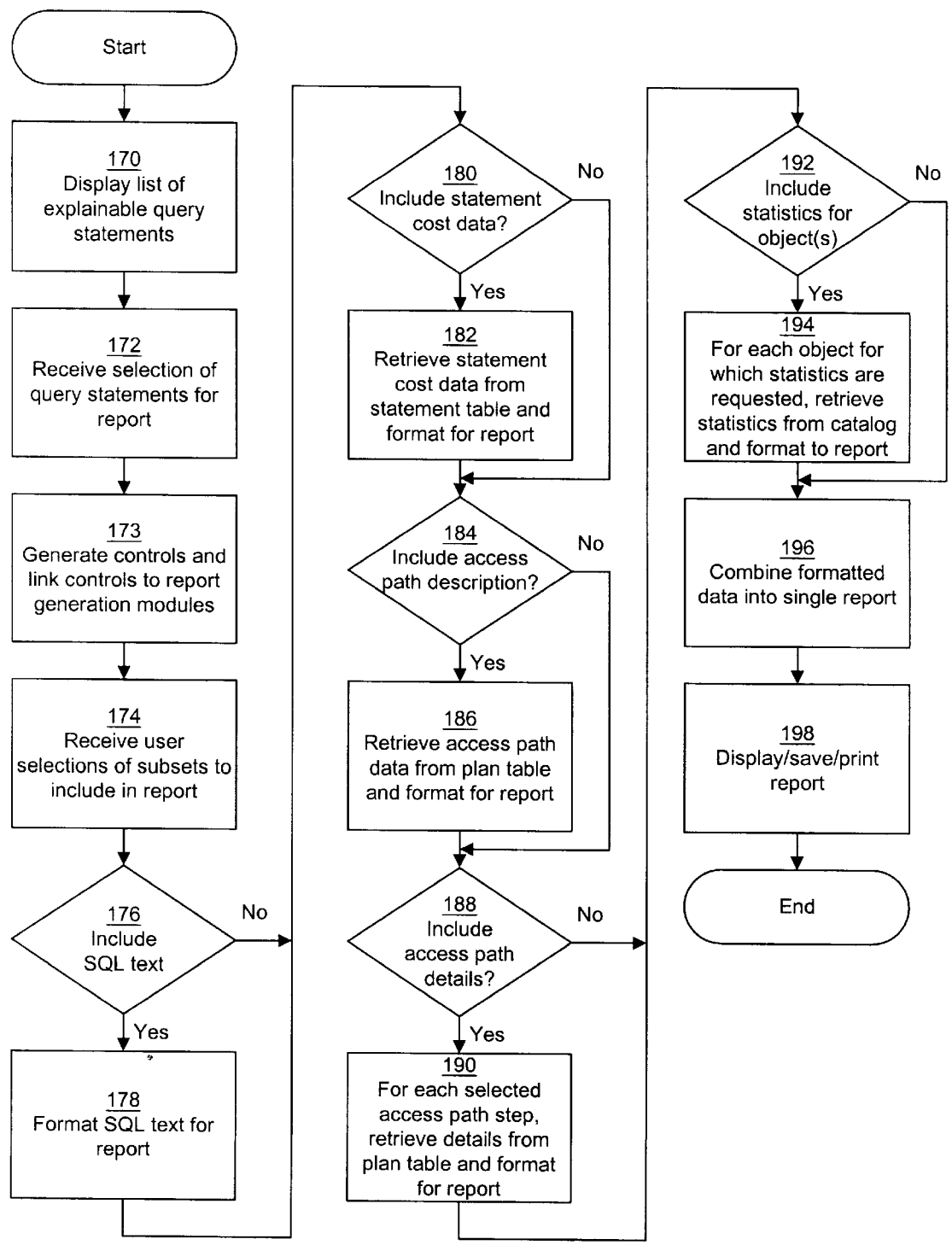
FIG. 10 is a schematic flow chart diagram illustrating a method for selectively preparing customized reports of query explain data according to one embodiment of the invention.

Referring now to FIG. 10, a schematic flow chart is illustrated for a method of selectively preparing customized reports of query explain data for one or more query statements. The method begins by displaying 170 the list of explainable query statements 112 to the user, as illustrated in FIG. 7. Thereafter, the query selection module 110 receives 172 the user's selection of one or more query statements to include in the report.

The method continues by generating 173 in the customization window 129 of FIG. 8 the plurality of selectable controls and linking the controls to the corresponding report generation modules. Thereafter, the report customization module 126 receives 174 the user's selections of the subsets of the query explain data to be included within the report for each query statement, as described above with reference to FIG. 8.

After the selections are received, a check 176 is made whether to include the SQL text of the selected query statements in the report. If the user selected the SQL text control 132 in step 174, the method continues by formatting 178 the SQL text for the report as described above.

If the SQL text control 132 was not selected, or after step 178, a check 180 is made whether to include in the report the statement cost data for the selected query statements. If the user selected the statement cost control 130 in step 174, the method continues by retrieving 182 the statement cost data from the statement table 78 (using the statement table querying module 76) and formatting the statement cost data for the report.

If the statement cost control 130 was not selected, or after step 182, a check 184 is made whether to include in the report the access path data for the selected query statements. If the user selected the access path control 134 in step 174, the method continues by retrieving 186 the access path data from the plan table 74 (using the plan table querying module 72) and formatting the access path data for the report.

If the access path control 134 was not selected, or after step 186, a check 188 is made whether to include in the report the details for individual access path steps of the selected query statements. If the user selected one or more of the controls in control set 136, the method continues by retrieving 190, for each step, the access path step details from the plan table 74 (using the plan table querying module 72) and formatting the access path step details for the report.

If none of the controls in the control set 136 were selected, or after step 190, a check 192 is made whether to include in the report the statistics for individual database objects. If the user selected one or more of the controls in control set 142, the method continues by retrieving 194, for each object, the statistics from the catalog 88 (using the catalog querying module 86) and formatting the object statistics for the report.

If none of the controls in the control set 142 were selected, or after step 194, the method continues by combining 196 the formatted data into a single report. Thereafter, the report output module 160 displays 198 the combined report to the user, and allows the user to selectively print and/or save the report.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for selectively preparing customized reports of query explain data for at least one query statement to be executed by a database, the apparatus comprising:
   a memory device having thereon modules of operational data and executable code for execution by a processor, the modules comprising:
      a plurality of report generation modules configured to selectively retrieve, from the database, subsets of the query explain data for the at least one query statement and to format the subsets for display to a user;
      a customization module configured to provide an interactive customization display on a display device; and
      a controls module configured to provide within the interactive customization display one or more controls for selectively designating subsets of the query explain data for the at least one query statement to be included in the report;
      wherein the report generation modules are selectively invokable by the one or more controls to include in the report the designated subsets of the query explain data for the at least one query statement.

2. The apparatus of claim 1, further comprising:
   a query selection module configured to receive a user selection of the at least one query statement.

3. The apparatus of claim 1, wherein the query statement comprises a Structured Query Language (SQL) statement.

4. The apparatus of claim 1, wherein at least a portion of the query explain data is generated by the database in response to one of a dynamic explain command and a binding of a query statement.

5. The apparatus of claim 1, wherein the query explain data comprises statement cost data comprising an estimated cost for executing the at least one query statement.

6. The apparatus of claim 5, wherein one of the report generation modules comprises a statement cost module configured to selectively retrieve from the database the statement cost data for the at least one query statement.

7. The apparatus of claim 6, wherein the statement cost data is stored within a statement table in the database.

8. The apparatus of claim 7, further comprising:
   a querying module coupled to the statement cost module and configured to query the statement table to obtain therefrom the statement cost data.

9. The apparatus of claim 1, wherein the query explain data comprises access path data comprising at least one access path step generated by the database to execute the at least one query statement.

10. The apparatus of claim 9, wherein one of the report generation modules comprises an access path module configured to selectively retrieve from the database the access path data for the at least one query statement.

11. The apparatus of claim 10, wherein the access path module is configured to selectively retrieve criteria details for at least one access path step selected from the group consisting of a sort, an index access, a multiple index access, a table space scan, a join, and a return.

12. The apparatus of claim 10, wherein the access path data is stored within a plan table in the database.

13. The apparatus of claim 12, further comprising:
   a querying module coupled to the access path module and configured to query the plan table in the database to obtain therefrom the access path data.

14. The apparatus of claim 1, wherein the query explain data comprises object statistics data including statistics for at least one database object accessed by the at least one query statement.

15. The apparatus of claim 14, wherein one of the report generation modules comprises an object statistics module configured to selectively retrieve from the database the object statistics for the at least one object accessed by the at least one query statement.

16. The apparatus of claim 14, wherein the object statistics module is configured to selectively retrieve object statistics for at least one object selected from the group consisting of an index, a table, a table space, a column, and a column distribution.

17. The apparatus of claim 16, wherein the object statistics data is stored within a catalog in the database.

18. The apparatus of claim 17, further comprising:
   a querying module coupled to the object statistics module and configured to query the catalog to obtain therefrom the object statistics data.

19. The apparatus of claim 1, wherein the query explain data comprises statement cost data including an estimated cost for executing the at least one query statement, access path data including at least one access path step generated by the database to execute the at least one query statement, and object statistics data including statistics for at least one database object accessed by the at least one query statement, the report generation modules comprising:
   a statement cost module configured to selectively retrieve from the database the statement cost data for the at least one query statement;
   an access path module configured to selectively retrieve from the database the access path data for the at least one query statement; and
   an object statistics module configured to selectively retrieve from the database the object statistics for the at least one object accessed by the at least one query statement.

20. A method for selectively preparing customized reports of query explain data for at least one query statement to be executed by a database, the method comprising:
   selectively retrieving from the database subsets of the query explain data for the at least one query statement;
   formatting the subsets for display to a user;
   displaying within a report customization window one or more controls for selectively designating subsets of the query explain data for the at least one query statement to be included in the report; and in response to selection of the one or more controls, generating a report that includes the designated subsets of the query explain data for the at least one query statement.

21. The method of claim 20, further comprising:
receiving a user selection of the at least one query statement.

22. The method of claim 20, wherein the query statement comprises a Structured Query Language (SQL) statement.

23. The method of claim 20, wherein at least a portion of the query explain data is generated by the database in response to one of a dynamic explain command and a binding of a query statement.

24. The method of claim 20, wherein the query explain data comprises statement cost data comprising an estimated cost for executing the at least one query statement.

25. The method of claim 24, further comprising:
selectively retrieving from the database the statement cost data for the at least one query statement.

26. The method of claim 25, wherein the statement cost data is stored within a statement table in the database.

27. The method of claim 26, further comprising:
querying the statement table to obtain therefrom the statement cost data.

28. The method of claim 20, wherein the query explain data comprises access path data comprising at least one access path step generated by the database to execute the at least one query statement.

29. The method of claim 28, further comprising:
selectively retrieving from the database the access path data for the at least one query statement.

30. The method of claim 29, further comprising:
selectively retrieving criteria details for at least one access path step selected from the group consisting of a sort, an index access, a multiple index access, a table space scan, a join, and a return.

31. The method of claim 29, wherein the access path data is stored within a plan table in the database.

32. The method of claim 31, further comprising:
querying the plan table in the database to obtain therefrom the access path data.

33. The method of claim 20, wherein the query explain data comprises object statistics data including statistics for at least one database object accessed by the at least one query statement.

34. The method of claim 33, further comprising:
selectively retrieving from the database the object statistics for the at least one object accessed by the at least one query statement.

35. The method of claim 34, further comprising:
selectively retrieving object statistics for at least one object selected from the group consisting of an index, a table, a table space, a column, and a column distribution.

36. The method of claim 34, wherein the object statistics data is stored within a catalog in the database.

37. The method of claim 36, further comprising:
querying the catalog to obtain therefrom the object statistics data.

38. The method of claim 20, wherein the query explain data comprises statement cost data including an estimated cost for executing the at least one query statement, access path data including at least one access path step generated by the database to execute the at least one query statement, and object statistics data including statistics for at least one database object accessed by the at least one query statement, the method further comprising:

selectively retrieving from the database the statement cost data for the at least one query statement;
selectively retrieving from the database the access path data for the at least one query statement; and
selectively retrieving from the database the object statistics for the at least one object accessed by the at least one query statement.

39. An article of manufacture comprising a program storage medium readable by a processor and embodying one or more instructions executable by the processor to perform a method for selectively preparing customized reports of query explain data for at least one query statement to be executed by a database, the method comprising:
selectively retrieving from the database subsets of the query explain data for the at least one query statement;
formatting the subsets for display to a user;
displaying within the report customization window one or more controls for selectively designating subsets of the query explain data for the at least one query statement to be included in the report; and
in response to selection of the one or more controls, generating a report that includes the designated subsets of the query explain data for the at least one query statement.

40. The article of manufacture of claim 39, the method further comprising:
receiving a user selection of the at least one query statement.

41. The article of manufacture of claim 39, wherein the query statement comprises a Structured Query Language (SQL) statement.

42. The article of manufacture of claim 39, wherein at least a portion of the query explain data is generated by the database in response to one of a dynamic explain command and a binding of a query statement.

43. The article of manufacture of claim 39, wherein the query explain data comprises statement cost data comprising an estimated cost for executing the at least one query statement.

44. The article of manufacture of claim 43, the method further comprising:
selectively retrieving from the database the statement cost data for the at least one query statement.

45. The article of manufacture of claim 44, wherein the statement cost data is stored within a statement table in the database.

46. The article of manufacture of claim 45, the method further comprising:
querying the statement table to obtain therefrom the statement cost data.

47. The article of manufacture of claim 39, wherein the query explain data comprises access path data comprising at least one access path step generated by the database to execute the at least one query statement.

48. The article of manufacture of claim 47, the method further comprising:
selectively retrieving from the database the access path data for the at least one query statement.

49. The article of manufacture of claim 48, the method further comprising:
selectively retrieving criteria details for at least one access path step selected from the group consisting of a sort, an index access, a multiple index access, a table space scan, a join, and a return.

50. The article of manufacture of claim 47, wherein the access path data is stored within a plan table in the database.

51. The article of manufacture of claim 50, the method further comprising:

querying the plan table in the database to obtain therefrom the access path data.

52. The article of manufacture of claim 51, wherein the query explain data comprises object statistics data including statistics for at least one database object accessed by the at least one query statement.

53. The article of manufacture of claim 52, the method further comprising:

selectively retrieving from the database the object statistics for the at least one object accessed by the at least one query statement.

54. The article of manufacture of claim 53, the method further comprising:

selectively retrieving object statistics for at least one object selected from the group consisting of an index, a table, a table space, a column, and a column distribution.

55. The article of manufacture of claim 52, wherein the object statistics data is stored within a catalog in the database.

56. The article of manufacture of claim 55, the method further comprising:

querying the catalog to obtain therefrom the object statistics data.

57. The article of manufacture of claim 39, wherein the query explain data comprises statement cost data including an estimated cost for executing the at least one query statement, access path data including at least one access path step generated by the database to execute the at least one query statement, and object statistics data including statistics for at least one database object accessed by the at least one query statement, the method further comprising:

selectively retrieving from the database the statement cost data for the at least one query statement;

selectively retrieving from the database the access path data for the at least one query statement; and selectively retrieving from the database the object statistics for the at least one object accessed by the at least one query statement.

* * * * *